United States Patent [19]

Pinckaers

[11] 4,181,957
[45] Jan. 1, 1980

[54] MEANS FOR CORRELATION OF DIGITAL DISPLAY OF A SETPOINT AND AN ACTUAL CONTROLLED VALUE

[75] Inventor: B. Hubert Pinckaers, Edina, Minn.

[73] Assignee: Honeywell Inc., Minneapolis, Minn.

[21] Appl. No.: 892,057

[22] Filed: Mar. 31, 1978

[51] Int. Cl.² ............................................. G01K 7/14
[52] U.S. Cl. ............................ 364/557; 235/92 MT; 73/362.4
[58] Field of Search ................. 364/557; 235/92 MT; 73/1 F, 343.5, 359 A, 362.4, 362.5, 362.7, 362 AR, 355 R, 362 R; 165/11; 236/94; 340/181

[56] References Cited

U.S. PATENT DOCUMENTS

| | | | |
|---|---|---|---|
| 3,766,535 | 10/1973 | Deebel et al. | 340/181 |
| 3,877,307 | 4/1975 | Georgi | 73/362 R |
| 3,942,123 | 3/1976 | Georgi | 73/362 AR |
| 3,942,718 | 3/1976 | Palmieri | 73/362 R |
| 4,030,363 | 6/1977 | Halleck | 73/362 AR |
| 4,071,745 | 1/1978 | Hall | 165/11 |
| 4,090,064 | 5/1978 | Turner | 235/92 MT |

Primary Examiner—Malcolm A. Morrison
Assistant Examiner—Gary Chin
Attorney, Agent, or Firm—Alfred N. Feldman

[57] ABSTRACT

A condition control system utilizing a digital display arrangement is disclosed. The system provides for a digital input of the setpoint of the system, and a digital display to display the setpoint selected for the system. The system also measures the controlled condition and provides a digital display of the output. The system provides further that when the controlled condition is within a predetermined or preselected range of the setpoint condition, that the digital display is caused to display the setpoint value even though it may be slightly different than the actual sensed value.

8 Claims, 1 Drawing Figure

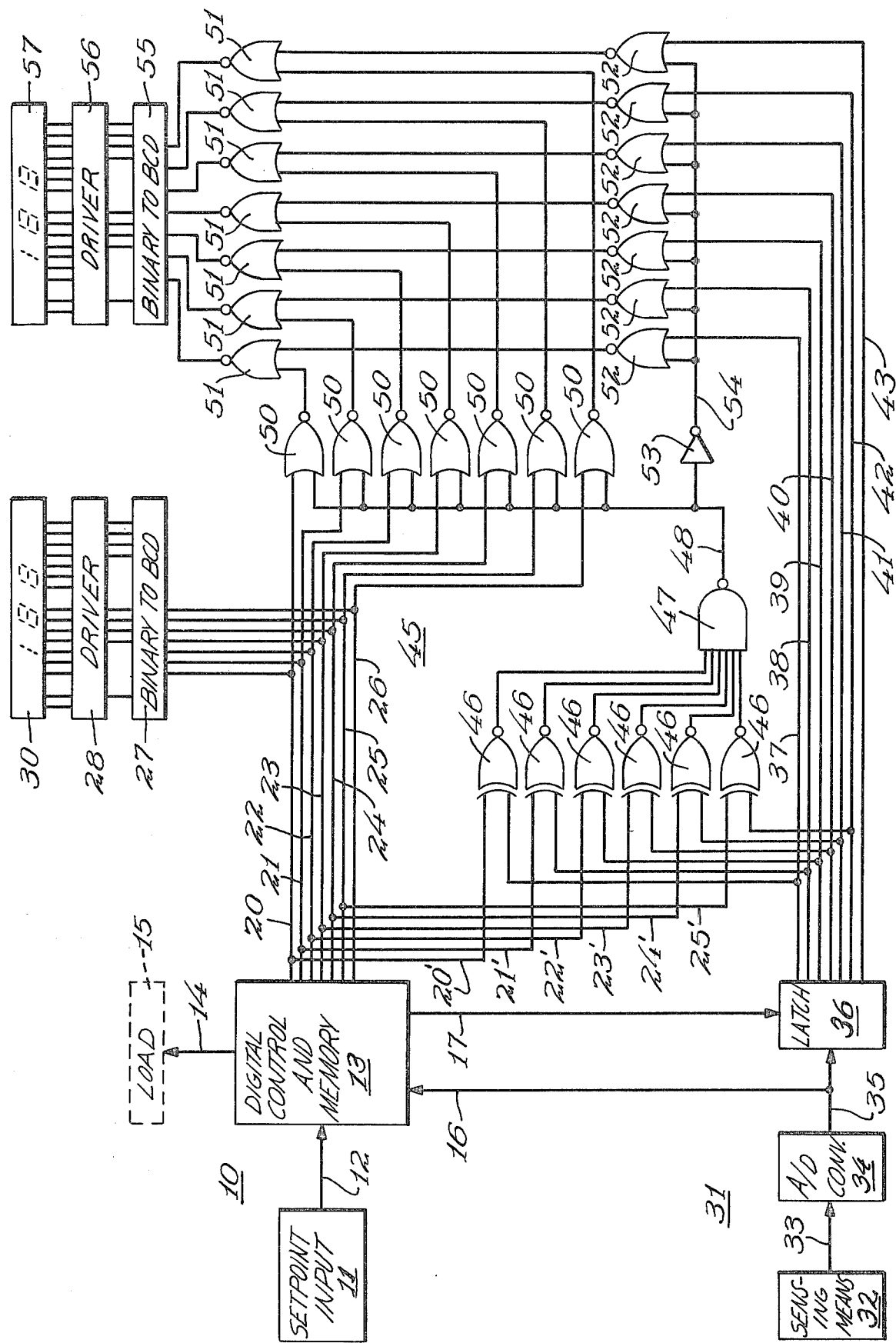

MEANS FOR CORRELATION OF DIGITAL DISPLAY OF A SETPOINT AND AN ACTUAL CONTROLLED VALUE

BACKGROUND OF THE INVENTION

The use of analogue types of condition control systems, such as temperature control systems, has been typical for many years. In such control systems the readout of the setpoint of the system and of the ultimate point at which the system is controlling normally was displayed on two separate analogue indicators. In early condition control systems where the condition being controlled was temperature, thermostats were provided with both a setpoint indicator and a simple and inexpensive thermometer to indicate the actual temperature that was present at the thermostat. Early experience in the thermostat art made it quite clear that if the setpoint indicator and the thermometer indicator were made concurrent with one another, any slight difference in the actual temperature indicated and the setpoint temperature brought customer complaints. Such a slight difference is normal and unavoidable with a furnace that cycles on and off. As a result of this, a typical thermostat will normally have a setpoint indicator which is located so that it does not read in a manner that can be visually directly compared with the thermometer mounted in the thermostat. This allows for a slight difference in the two without complaints from the user.

In more recent condition control equipment, and particularly in the thermostat art, the use of digital displays has become quite common. By the use of an analogue to digital converter, digital displays, and some logic circuitry it is possible to provide very high quality and accurate solid state types of thermostats and other types of solid state process and condition control devices. In these types of devices, it is normal to display both the setpoint and the actual controlled condition. In a thermostat, it would be the setpoint temperature and the actual temperature of the controlled space. Ideally these two readings should be the same, when the controlled space is at or near the desired or setpoint temperature. However, because of the lags in the system, the cycling rates, and component tolerances, these readings would usually be different, even with an excellent control system with a good comfort control. For example, assuming a plus or minus one degree Fahrenheit accuracy or resolution of the digital readings, the digitally indicated setpoint temperature may differ as much as two degrees Fahrenheit from the actual temperature even if, in fact, they are within a fraction of a degree of one another.

The use of a digital display of the setpoint and of the actual temperature on a thermostat could cause customer or user complaints when in fact the device was functioning properly.

SUMMARY OF THE INVENTION

The present invention proposes to compare the readings of setpoint and the actual temperature in a control device or thermostat, and if within one or two degrees Farhenheit (depending on the specific application) to automatically cause the display of the actual temperature reading to equal the setpoint reading. This can easily be done with a logic circuit which compares the digital numbers representing the two temperatures. Therefore, when the actual temperature nears the setpoint temperature, they will become the same as far as the readout or display is concerned, and this will remove the possibility of confusion as to which is right when they are nearly the same.

BRIEF DESCRIPTION OF THE DRAWING

The single drawing disclosed is a substantially block diagram disclosure of a condition control system having a digital setpoint, digital condition sensing, and digital display of the result.

DESCRIPTION OF THE PREFERRED EMBODIMENT

While the present invention can be utilized with any type of a condition control system that has a digital setpoint means for introducing a setpoint signal and a digital readout of the response of the condition control system, the present description will be directed to a temperature control system. More specifically, the present description will be simply directed to a thermostat for a heating application where the condition control operates a load such as a furnace. It is obvious that heating, cooling, or a combination type system could typically use the present invention and could be readily applied to such systems by anyone skilled in the art.

The system includes digital setpoint means generally disclosed at 10 which includes a digital setpoint input means 11 that could be a standard type of keyboard or its equivalent. The setpoint input means 11 is connected electrically at 12 to a digital control circuit and memory 13. The digital control circuit 13 can be of any convenient digital design and provides four basic functions. The first function is to provide an output on conductor 14 which is connected to a load means 15 that has been referred to previously as a furnace. A digital 1 on conductor 14 would turn the load or furnace 15 "on". A digital 0 would leave the load 15 "off". The digital control circuit 13 responds to an input on conductor 16 to compare that input with the input on conductor 12 to determine whether the digital control circuitry should or should not activate the load 15. The digital control circuitry 13 provides two additional outputs. The first output is on conductor 17 which is a clocked output to periodically gate a further portion of the circuit. Also provided are a series of conductors or outputs 20, 21, 22, 23, 24, 25 and 26. The conductors 20 through 26 provide a seven bit binary set point data output with the most significant bit on conductor 20 and the least significant bit on conductor 26. The conductors 20 through 26 are connected directly to a conventional binary to binary coded decimal converter 27 which in turn is connected to a standard binary coded decimal to seven segment decoder driver 28 which in turn drives a digital display 30. The digital display 30 has been shown as a three digit display which would be capable of displaying outdoor temperatures of over one hundred degrees in Fahrenheit or could be used with a decimal between the last two digits to supply a complete digital display of Celsius temperatures. The display 30 is the set point display that corresponds to whatever set point is placed in the keyboard or set point input means 11.

The present thermostat or digital display system includes a condition responsive means generally disclosed at 31. This condition responsive means includes a temperature responsive device or system 32. The temperature responsive device or system 32 could be of any type which generates an analogue voltage on conductor 33 in response to the condition responsive sensing circuit 32. The circuit 32 could be a conventional temperature responsive or condition responsive element feeding a bridge which in turn feeds an amplifier and provides a linear voltage output on conductor 33 that corresponds to a change in the condition being sensed by the condition responsive means 31. The analogue signal on conductor 33 is fed to a conventional analogue to digital converter 34 that has a seven bit digital output. This analogue to digital converter provides an output on conductor 35 to the conductor 16 and is an input to the digital control circuit 13 as well as to a condition responsive latch circuit 36. The condition responsive latch circuit 36 responds to a clock signal on conductor 17 and periodically passes the output of the analogue to digital converter 34 from conductor 35 through a series of conductors 37, 38, 39, 40, 41, 42 and 43. The conductor 37 carries the most significant bit output from the latch circuit 36 while the conductor 43 carries the least significant bit output.

Each of the conductors 37 through 42 (not including the conductor 43 carrying the least significant bit) are connected as inputs to part of a comparator means generally disclosed at 45. The comparator means 45 includes six exclusive NOR gates 46 with each of the NOR gates 46 having one of the conductors 37 through 42 connected to its input. The NOR gates 46 each also receive one of their inputs from a series of conductors 20', 21', 22', 23', 24' and 25'. The conductors 20' through 25' connect directly back to the output of the digital control circuit 13. All of the outputs of the exclusive NOR gates 46 are fed to a single NAND gate 47 which has an output on conductor 48.

The comparator means generally disclosed at 45 is further implemented by three sets of NOR gates 50, 51, and 52. Each of the sets include seven identical gates 50, 51, and 52. All of the NOR gates 50 have a common connection to conductor 48 at one of their inputs while each of the seven NOR gates 50 are further individually connected to the conductors 20 through 26. Also connected to the conductor 48 is a NOT gate 53 which inverts the signal on conductor 48 and supplies it on conductor 54 to each of the NOR gates 52 as one of their two inputs. The NOR gates 52 further have inputs connected to the conductors 37 through 43.

The output of each of the NOR gates 50 and 52 form individual and separate inputs by a series of conductors to the NOR gates 51 to thereby control the NOR gates 51 in operation. Each of the NOR gates 51 are connected to a further conventional binary to binary coded decimal converter 55 that in turn is connected to a conventional binary coded decimal to seven segment decoder driver 56 that drives a digital display 57. The digital display 57 again has been disclosed as a three digit display which is capable of displaying the room temperature or the condition being controlled as opposed to the setpoint condition displayed on the digital display 30. It should be understood that while the present disclosure discloses two sets of binary to binary coded decimal converters, binary coded decimal to seven segment drivers and two separate digital displays, that a single digital display could be utilized with the proper mechanical switching to activate one function or the other, or by appropriate digital multiplexing of the signals. The disclosure of two individual displays has been provided for simplicity in understanding the present invention and should not be considered as a limitation. In a practical thermostat, a space or cost limitation could very easily limit the display to a single display that could be set to display either the setpoint temperature for the thermostat, the actual room temperature or sensed temperature, or could be switched between these two types of functions either automatically or manually by the user.

OPERATION

The operation of the system disclosed will be explained as if the system is a conventional thermostat controlling a heating load or furnace 15. Under these conditions, the temperature sensing circuit 32 would be sensing continuously the ambient or room temperature and providing an analogue signal on conductor 33 to the analogue to digital converter 34. This signal would be provided continuously to the latch circuit means 36 and also as an input on conductor 16 to the digital control circuit 13. At the same time the digital control circuit 13 would be receiving a digital input of the correct set temperature and it would make a comparison to determine whether the load 15 should be "on" or "off". At this same time the digital control circuit 13 would be providing a signal to the conductors 20 through 26 indicative of the setting of the set point input means 11. Up to this point, all of the control would function merely as a conventional digital thermostat for control of the load 15 wherein two sets of digital outputs are available. The first set of digital data would be on conductors 20 through 26 which would provide for the display of the setpoint temperature on the digital display 30. At the same time the digital control circuit 13 provides a clocked pulse on conductor 17 to periodically provide the necessary digital information on conductors 37 through 43 of what the actual room temperature or ambient temperature was.

Both the actual digital setpoint input means signals on conductors 20' through 25' and the output of the condition responsive means 31 is provided on conductors 37 through 42 to the comparator exclusive NOR gates 46. It will be noted that all of the information is supplied to the six exclusive NOR gates 46 except the least significant bit which is on conductor 26 and on conductor 43. The exclusive NOR gates 46 thus are in a position to compare the digital input from the digital input setpoint means 11 and from the condition responsive means 31. The exclusive NOR gates 46 compare this information and provide an output on conductor 48 which is either a 0 or a 1 depending on whether the compared signal is equal to the last significant bit or is different than the last significant bit.

If it is assumed that the temperature set into the digital setpoint input means 11 is within one digit of the temperature being sensed by the temperature sensing means 32, the signal on conductor 48 is such that when it is combined with the signals on conductors 20 through 26 that the NOR gates 50 are all enabled and have an appropriate output. The signal on conductor 48 is inverted by the NOT gate 53 and is provided on conductor 54 where it is combined with the signals on conductors 37 through 43 to disable the NOR gates 52 so that they are blocked from providing a signal to the digital readout 57.

The enabling of the NOR gates 50 provides a signal to the NOR gates 51 and the NOR gates 51 are enabled to pass through the signal from the NOR gates 50 thereby creating a direct flow of digital information from the conductors 20 through 26 which represent the setpoint of the system as opposed to the actual sensed temperature. The flow of digital information from the conductors 20 through 26 through the NOR gates 50, and through the NOR gates 51 to the converter 55, driver 56 and display 57 provides for the display of a temperature which is identical to the display on the display 30 of the setpoint of the control system or thermostat.

If the difference between the actual sensed temperature and the setpoint of the system is more than one, the output of the NAND gate 47 is such to provide a digital signal on conductor 48 which disables the NOR gates 50 and enables the NOR gates 52 to pass through the actual temperature reading from the NOR gates 52 to the NOR gates 51 where they pass to the converter 55, the decoder driver 56 and the display 57.

Very briefly, it is thus seen that the comparator means 45 either allows the setpoint digital display signal to be passed not only to its permanently connected digital display 30, but through a set of gates 50 and 51 to the display 57. This requires the disabling of the gates 52 by the output signal on conductor 48. If the comparator means 45 senses that the last significant bit is within one, the comparator means 45 changes so that the NOR gates 50 are disabled and the NOR gates 52 are enabled to provide a flow of digital information through the NOR gates 52 and 51 to the display 57 thereby actually displaying the correct sensed temperature or condition.

It can thus be seen that with the present arrangement, it is possible to use a digital comparator means to compare the setpoint means 10 with the condition responsive means 31. If the signal is within a predetermined number of digits selected by the design of the system, the display means made up of the displays 30 and 57 will display the setpoint input data regardless of what the actual sensed temperature is. If the sensed temperature or condition at the condition responsive means 31 is more than the set number of digits established by the design of the system, the displays 30 and 57 will display the actual setpoint of the setpoint device or means 11, and the actual condition being sensed by the condition sensing circuit 32. As has been previously stated, the displays 30 and 57 could be a single display that is multiplexed or mechanically switched in order to save space and cost.

The design of the comparator means and of the various components that go into the condition control system can be altered in numerous ways with different types of digital logic. A single highly simplified digital arrangement has been disclosed as a means of describing the present invention. In view of this, the applicant wishes to be limited in the scope of his invention solely by the appended claims.

The embodiments of the present invention in which exclusive property or right is claimed are defined as follows.

1. A digital display arrangement adapted to display a digital setpoint for a condition control system and further adapted to display a digital response for said condition control system, including: digital setpoint means having digital setpoint input means for selecting a setpoint for said condition control system; digital display means connected to said digital setpoint means to display said setpoint; condition responsive means having a condition responsive digital output; said digital display means connected to said condition responsive means to display the status of said condition control system; and comparator means for comparing said digital setpoint with said condition responsive digital output wherein said comparator means causes said digital display means to display only said setpoint when said setpoint and said condition responsive means are within a preselected range.

2. A digital display arrangement as described in claim 1 wherein said condition control system is a temperature responsive system with said digital display means used to display temperatures.

3. A digital display arrangement as described in claim 2 wherein said digital display means includes two digital displays; a first of said displays showing the setpoint temperature; and a second of said displays showing the control temperature status.

4. A digital display arrangement as described in claim 3 wherein said comparator means has a fixed reference temperature difference of display that is less than a temperature difference than that which would provide a good level of comfort control.

5. A method of operating a condition sensing system having digital display means to display the desired operating level of the system and the condition being sensed, comprising the steps of: providing a condition sensing system including display means; setting a desired operating level into said sensing system; sensing the operating level of said system; comparing the set level of said sensing system and the operating level of the system; and causing the display means to display only the set operating level upon said sensed condition being within a predetermined value of said set operating level.

6. A method of operating a condition sensing system as described in claim 5 wherein said condition sensing system is a temperature responsive system.

7. A method of operating a condition sensing system as described in claim 6 wherein said digital display means includes two digital displays; a first of said displays showing the setpoint temperature level; and a second of said displays showing the control temperature status.

8. A method of operating a condition sensing system as described in claim 7 wherein said comparing of the set level of said sensing system and the operating level of the system is a fixed temperature difference that is less than a temperature difference than that which would provide a good level of comfort control.

* * * * *